United States Patent [19]
Arn et al.

[11] 3,801,062
[45] Apr. 2, 1974

[54] MANUAL VALVE OVERRIDE

[75] Inventors: Fred A. Arn, Rockville; William J. Dowicki, Vernon; Howard E. Pierce, Watertown, all of Conn.

[73] Assignee: Contromatics Corporation, Rockville, Conn.

[22] Filed: May 25, 1973

[21] Appl. No.: 364,140

[52] U.S. Cl............................ 251/14, 251/58, 74/625
[51] Int. Cl............................................. F16k 31/14
[58] Field of Search ........... 74/625; 251/14, 250, 58

[56] References Cited
UNITED STATES PATENTS
3,007,487 11/1961 Adams................................. 251/14

Primary Examiner—Henry T. Klinksiek

[57] ABSTRACT

Valves for controlling fluid flow known to the prior art have included various means for selective remote control in the event of failure of the primary power drive for the valve and in general these devices have utilized a separate control to engage and disengage a manual control while at the same time disconnecting a power control. The invention provides a cam member fixed to a drive shaft for manual control of the valve. The cam member has a surface disposed obliquely with respect to the axis of the drive shaft and angular indexing of the drive shaft without other movement provides for urging the drive shaft either into or out of engagement with another drive member.

7 Claims, 1 Drawing Figure

MANUAL VALVE OVERRIDE

BACKGROUND OF THE INVENTION

Valves having both an automatic or power driven mode of operation as well as a manual mode of operation are well known in the art. It is desirable to provide means for driving many valves manually in the event of failure of the hydraulic, pneumatic or electrical powered means by which they are conventionally driven. The mechanisms that have been typically used often necessitate a separate control for disengaging the power driven mechanism and engaging a manual drive mechanism. Such structures are relatively complicated to build as well as being more difficult to operate because of the second control required. Many such devices require a substantial amount of torque for operation manually because of the retarding effect of the powering mechanism. Because of the high torque and also the two discrete controls such devices have not been readily suitable for remote operation as may be encountered in naval or other applications where it is desirable to have a manual override in the event of failure of the electrical, pneumatic or hydraulic means which normally operate a valve which is inaccessible.

SUMMARY OF THE INVENTION

The invention contemplates a valve having a housing having a flow passage therethrough and a flow restricting member mounted on a pivotally mounted axle for selective movement between flow obstructing and flow passing positions. The valve further includes a drive shaft carried by the housing for rotation and axial movement and having means for engaging and driving the axle at a first end of the drive shaft. Means are provided for rotating the drive shaft at a second end of the drive shaft and this means may be a simple handle. Means for selectively engaging and disengaging the drive shaft from driving engagement with the axle comprising means for axially displacing the drive shaft from a first position where the drive shaft engages the axle to a second position where the drive shaft is disengaged from the axle. The means for axially displacing the drive shaft is responsive to rotation of the drive shaft.

Most commonly, the means for axially displacing the drive shaft comprises a cam member carried on the drive shaft in generally transverse relationship, the member has a generally planar surface thereof within a plane at an oblique angle with respect to the axis of the drive shaft and the generally planar surface has a first point and a second point in axially and radially spaced relationship. The first point is further from the first end of the shaft than the second point measured in an axial direction. The means for axially displacing the drive shaft ordinarily will also include standoff means supported by the valve housing and being selectively alignable with and between the first point on the planar surface of the cam member and the valve housing. The standoff means is also selectively alignable with and between the second point on the planar surface of the cam member and the valve housing. The standoff means when positioned against the first point urges the drive shaft into the first position wherein the first end of the drive shaft is in driving engagement with the axle. The standoff means comprises normally a disc rotatably carried on the drive shaft having one face thereof abutting the valve housing and the opposite face thereof having an upstanding portion engaging the planar surface of the cam member. Means are provided for biasing the drive shaft axially toward the upstanding portion engaging the planar face of the cam member to provide positive engagement between the planar surface and the upstanding portion engaging the planar face of the cam member. The upstanding portion engaging the planar face of the cam member may include a ball rotatably carried for rolling engagement with the planar surface.

Detent means may be provided to restrain the rotational movement of the disc about the drive shaft comprising a conventional ball detent structure. The valve may also include a double acting piston and cylinder means having first and second fluid connection ports in fluid communication with opposite sides of the piston and a separate pressure equalization valve may be connected to the first and second fluid connection ports together with means for opening the pressure equalization valve when the drive shaft is in the first position whereby pressure is equalized across the piston and no net forces are imposed on the axle thereby.

The objects of the invention include provision for a valve having dual control modes which may be manual and another which may be either hydraulic, pneumatic or electrical.

It is another object of the invention to provide a valve override responsive purely to a single control such as a single handle which is rotated to produce both the movement of the valve as well as the function of disconnecting the alternate power source.

It is a further object of the invention to provide a manual valve override which avoids the retarding effect of the powering mechanism to reduce the amount of torque required.

It is still another object of the invention to provide apparatus which is suitable for operating the valve manually from a location remote from the valve body.

It is yet another object of the invention to provide apparatus which is simple and easy to construct and operate.

Still other objects, features and advantages of the present invention will become apparent to those skilled in the art from a reading of the following detailed description of a preferred embodiment, taken in conjunction with the accompanying drawing, wherein like reference numerals designate like or corresponding parts throughout the several views.

DETAILED DESCRIPTION OF THE PREFERRED EMBODIMENT

Figure 1:
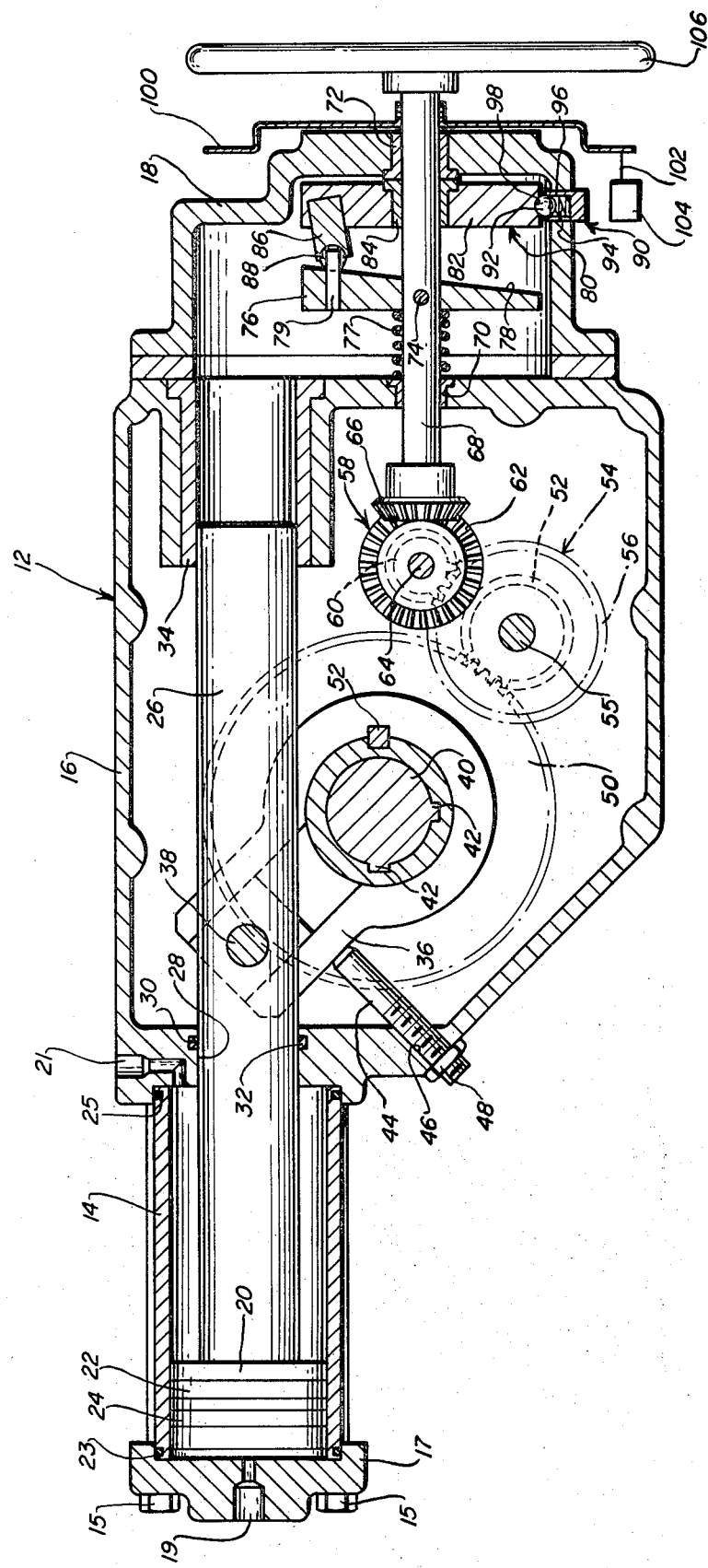
FIG. 1 is a sectional, axial view of a valve in accordance with the present invention.

Referring to the drawing, the valve of the invention comprises a valve body or housing 12 having a first chamber 16 and a second chamber 18. A cylinder 14 is fixed to the valve body 12 by means of bolts 15 which secure a head 17 to the cylinders 14. Ports 19 and 21 are provided to direct pressure to alternate sides of the piston 20. Seal 23 is provided to prevent leakage between the cylinder 14 and the head 17. A seal 25 is provided to prevent leakage in a similar manner between cylinder 14 and the valve body 12.

A piston 20 carried within the cylinder 14 is provided with circumferential grooves (not shown) for carrying seals 22, 24. Fixed to the piston is an elongated piston rod 26 which extends into the first chamber 16 through a passageway 28 in aligned relationship. Within the passageway 28 is a groove 30 which holds a seal 32 adapted for sealing circumferentially the piston rod as it moves axially within the passageway 28. The right-hand end of the piston rod 26, as viewed, is guided for axial movement by a bushing 34.

Pivotally connected to the piston rod 26 is a crank arm 36 which is connected to the piston rod 26 by a pin 38. The crank arm 36 rotates with an axle 40 to which it is connected by splines 42, 42. The axle 40 carries a butterfly, ball or other flow obstructing member (not shown) which is contained within a flow passage (not shown). A stop 44 is carried by the valve body 12 within a threaded aperture 46 and fixed in place by nut 48.

A gear 50 is connected by a key 52 to crank arm 36 for rotational movement with the crank arm and axle 40. The periphery of gear 50 is disposed in engagement with the smaller diameter portion 52 of a stepped gear 54. The stepped gear 54 is carried on a shaft 55 which is fixed to a valve body 12. A larger diameter portion 56 engages another stepped gear 58 having a smaller diameter spur gear portion 60 in engagement with stepped gear 54 and a larger diameter bevelled gear portion 62. Stepped gear 58 is carried radially on a shaft 64 fixed to the valve body 12.

A second bevelled gear 66 is shown in the engaged position with bevelled gear portion 62. In accordance with the invention bevelled gear 66 may be selectively moved to the right as shown out of engagement with bevelled gear portion 62. Bevelled gear 66 is carried on a drive shaft 68 which is supported for rotation by bushings 70, 72 carried by the valve body 12. Angular spring biasing (not shown) is provided between drive shaft 68 and bevelled gear 66 whereby the latter will move angularly in the event the crests of the bevelled gear 66 and bevelled gear portion 62 contact as the teeth thereof mesh. Fixed to the drive shaft 68 by a pin 74 is a cam member 76 having a generally planar surface 78 which is disposed within a plane at an oblique angle with respect to the axis of the drive shaft. A projecting stop member 79 is fixed to the cam member 76 at a radial distance from the drive shaft 68. A spring 77 is carried on drive shaft 68 between cam member 76 and bushing 70 to axially bias drive shaft 68 to the right as viewed.

A standoff 80 is provided to maintain the clearance between generally planar surface 78 and the wall of second chamber 18. The standoff comprises a disc 82 carried by a bushing 84 for free rotation about drive shaft 68. A post 86 projects from one face of the disc 82 and carries a ball 88 in rotatable relation thereto. The radial distance from the axis of the drive shaft to the ball 88 centerline is equal to the radial distance from the axis of the drive shaft to the centerline of the projecting stop member 79 which is carried by the cam member 76 and projects from the generally planar surface 78.

A ball detent assembly 90 comprises a ball 92 and spring 94 contained within a recess 96 within second chamber 18. Disposed at intervals about the disc 82 are a plurality of depressions 98 (one shown) to provide the desired retarding action on the rotation of standoff 80 about drive shaft 68.

A plate 100 is fixed to the drive shaft 68 by suitable means (not shown). A portion of the plate is in contact with a plunger 102 of a pressure equalization valve 104. Axial movement of the plate 100 against the plunger 102 causes the pressure equalization valve 104 to open or close. In the position shown, the pressure equalization valve is opened and suitable connections are provided between the two ports of pressure equalization valve 104 and the cylinder ports 19 and 21 whereby when the plate 100 is in the position shown the pressure at ports 19 and 21 is equalized by placing the two ports in fluid communication. Also fixed to the drive shaft 68 is a hand wheel 106 for manual operation of the valve.

In operation, axial movement of drive shaft 68 is achieved by means of the camming action of generally planar surface 78 against the standoff 80. Rotation of the hand wheel 106 for three hundred and sixty degrees or more clockwise causes stop 79 on cam member 76 to strike the side of the ball 88 which causes the standoff assembly 80 to rotate synchronously with the drive shaft 68 despite the action of the detent assembly 90. More specifically, the detent assembly will be forced to slip upon the application of torque through the hand wheel 106. Movement of the drive shaft in this manner will act through bevelled gear 66 and the remaining portions of the drive train to rotate axle 40 and position the ball, butterfly or other flow obstructing member within the flow passage of the valve.

Rotation of the hand wheel 106 one hundred and eighty degrees counterclockwise from the last position noted above positions the wide end of the cam member 76 away from the ball 88. The ball 88 is held in place together with the remaining portions of the standoff assembly 80 by the detent assembly 90. With the narrow end of the cam member 76 accordingly positioned adjacent to the ball 88 the spring 77 will cause the shaft 68 and gear 66 fixed thereto to move to the right as viewed out of engagement with the gear train and accordingly out of driving relationship with the axle 40.

Various alternates will be apparent to those skilled in the art which may include a change in direction of the spring bias and an associated change in the angle of the oblique plane. Also, the dual operation shown in the preferred embodiment is not necessarily hydraulic or pneumatic combined with manual but may also be electrical though combined with hydraulic or any of various other combinations. Particularly, with an electric motor drive it is particularly convenient to step the drive shaft 68 to provide the necessary indexing of the cam member 76 with respect to the standoff assembly 80. Similarly, the manner of engagement between the drive shaft 68 and the axle 40 is not necessarily by means of gears and particularly bevelled gears, but also may be accomplished by means of a clutch utilizing friction or other suitable means. A yoke is particularly conveniently operated by the drive shaft 68 to connect and disconnect the frictionally engaged surfaces in this form. It will be understood by those skilled in the art that a cam plate may be utilized together with a standoff which is manually controlled by means which are independent from the hand wheel 106 without departing from the invention. It will also be understood that the invention may have application to structures other than valves and particularly to those where dual means of driving various apparatus may be required.

It will be seen by those skilled in the art that a valve in accordance with the invention provides for dual control and that in the event of manual control of the valve the operation requires a minimum amount of torque because drag created by a power source is eliminated. It is further evident that the valve of the invention is readily adaptable to remote operation because it is not necessary to provide separate drive connections to two separate controls as is commonly required. Instead, it is merely necessary to have a single, rotatably mounted drive provided to the valve in the event the hydraulic, pneumatic or electrical power drive becomes inoperative. It is also apparent that the valve as described is simple to operate and to construct.

What is claimed is:

1. In a valve having a housing having a flow passage therethrough and a flow restricting member mounted on a pivotally mounted axle for selective movement between flow obstructing and flow passing positions, the improvement which includes:
   a. a drive shaft carried by the housing for rotation and axial movement and having means for engaging and driving the axle at a first end of said drive shaft;
   b. means for rotating said drive shaft at a second end of said drive shaft; and
   c. means for selectively engaging and disengaging said drive shaft from driving engagement with said axle comprising means for axially displacing said drive shaft from a first position where said drive shaft engages said axle to a second position where said drive shaft is disengaged from said axle, said means for axially displacing said drive shaft being responsive to rotation of said drive shaft.

2. The valve as described in claim 1 wherein said means for axially displacing said drive shaft comprises a cam member carried on said drive shaft in generally transverse relationship, said member having a generally planar surface thereof within a plane at an oblique angle with respect to the axis of said drive shaft, said generally planar surface having a first point and a second point in axially and radially spaced relationship, said first point being further from said first end of said shaft than said second point measured in an axial direction.

3. A valve as described in claim 2 wherein said means for axially displacing said drive shaft further includes standoff means supported by the valve housing and being selectively alignable with and between said first point on said planar surface of said cam member and said valve housing and also selectively alignable with and between said second point on said planar surface of said cam member and said valve housing, said standoff means when positioned against said first point urging said drive shaft into said first position wherein said first end of said drive shaft is in driving engagement with said axle.

4. The valve as described in claim 3 wherein said standoff means comprises a disc rotatably carried on said drive shaft, said disc having one face thereof abutting said valve housing and the opposite face thereof having an upstanding portion engaging said planar face of said cam member, and further including means for biasing said drive shaft axially toward said upstanding portion engaging said planar face of said cam member to provide positive engagement between said planar surface and said upstanding portion engaging said planar face of said cam member.

5. A valve as described in claim 4 wherein said upstanding portion engaging said planar face of said cam member includes a ball rotatably carried for rolling engagement with said planar surface.

6. The valve as described in claim 5 wherein detent means are provided to restrain the rotational movement of said disc about said drive shaft, said detent means comprising a plurality of depressions disposed at angular intervals about the circumference of said disc and a spring loaded ball carried by said housing selectively alignable with each of said depressions and said ball being biased toward one of said depressions, said cam member being provided with an upstanding stop on said planar surface positioned for engagement with said upstanding portion engaging said planar face of said cam member upon angular indexing of said drive shaft.

7. The valve as described in claim 6 further including a double acting piston and cylinder means, said cylinder having first and second fluid connection ports in fluid communication with opposite sides of said piston, said valve also including a pressure equalization valve connected to said first and second fluid connection ports, means for opening said pressure equalization valve when said drive shaft is in said first position whereby pressure is equalized across said piston and no net forces are imposed on said axle thereby.

* * * * *